United States Patent [19]

Eby et al.

[11] Patent Number: 4,905,968

[45] Date of Patent: Mar. 6, 1990

[54] INSULATOR FOR AN ELECTRIC FENCE AND ELECTRIC FENCE INCLUDING THE SAME

[75] Inventors: David L. Eby, Wakarusa; Wayne A. Stockman, Plymouth, both of Ind.

[73] Assignee: Boundaries Unlimited, Inc., Plymouth, Ind.

[21] Appl. No.: 283,496

[22] Filed: Dec. 12, 1988

[51] Int. Cl.[4] .......................... A01K 3/00; H01B 17/14

[52] U.S. Cl. .................................. 256/10; 174/158 F; 174/166 R; 174/171; 256/47

[58] Field of Search ...................... 174/45 R, 156, 157, 174/158 F, 161 F, 163 F, 164, 166 R, 171; 248/65, 67.5, 71, 73, 74.2; 256/10, 19, 45-54, DIG. 3

[56] References Cited

U.S. PATENT DOCUMENTS

| | | | |
|---|---|---|---|
| 2,618,685 | 11/1952 | Lewis | 174/161 F |
| 2,756,958 | 7/1956 | Binns et al. | 174/163 F X |
| 3,524,923 | 8/1970 | Zeeb | 174/163 F |
| 3,654,383 | 4/1972 | Wilson | 174/163 F |
| 4,111,400 | 9/1978 | Enoksson | 256/47 |
| 4,494,733 | 1/1985 | Olsson | 256/10 |
| 4,728,080 | 3/1988 | Kurschner et al. | 256/10 |

FOREIGN PATENT DOCUMENTS

| | | | |
|---|---|---|---|
| 650108 | 9/1937 | Fed. Rep. of Germany | 174/171 |
| 1189961 | 4/1970 | United Kingdom | 174/171 |

*Primary Examiner*—Laramie E. Askin
*Attorney, Agent, or Firm*—Todd A. Dawson

[57] ABSTRACT

An insulator for an electric fence comprising a separate clip part and a base support for connecting a woven wire electric conductor to a variety of fence posts. The clip part snap fits over a fiberglass fence post with the electric conductor retained therebetween. To connect the electric conductor to either a metal or wood fence post the base is first secured to the post either by bands or by nails. The clip part is then snap fitted over the base with the electric conductor retained therebetween.

5 Claims, 3 Drawing Sheets

INSULATOR FOR AN ELECTRIC FENCE AND ELECTRIC FENCE INCLUDING THE SAME

SUMMARY OF THE INVENTION

This invention relates to insulators and will have application to an insulator for an electric fence.

Recently, a woven wire ribbon has been developed for use as an electric fence to maintain animals within a predetermined area. Such an electric fence wire construction is illustrated in U.S. Pat. No. 4,728,080 issued to Kurschner et al. on Mar. 1, 1988.

Heretofore, to support and insulate the conductive wire, an insulator of a trough or U-shaped form having an overlying retaining clip has been used. In such an insulator, the conductive wire is positioned within the trough and the retaining clip is secured over the top of the trough. A problem sometimes associated with this prior insulator is the unreliability of the clip and the lack of adaptability of the insulator to the variety of fence posts available.

A second type of prior insulator for a conductive wire is illustrated in U.S. Pat. No. 4,494,733 issued to Jan Olsson on Jan. 22, 1985. Olsson discloses an insulator having two identical parts being fitted together and secured to a fence post, and to each other, by a nail. The conductive wire is positioned between the sections. One problem associated with the Olsson insulator is that to replace or repair the fence, a user would have to detach the insulator from the post.

The insulator of this invention eliminates the problems experienced with these prior insulators by providing a clip which is adapted to insulate and attach a woven electric ribbon to a wide variety of supporting post shapes and constructions.

Accordingly, it is an object of this invention to provide a novel insulator for an electric fence.

Another object of this invention is to provide an insulator easily adaptable to a variety of supporting fence posts.

Further objects of this invention will be apparent upon a reading of the following description.

DESCRIPTION OF THE PREFERRED EMBODIMENT

The preferred embodiment herein disclosed is not intended to be exhaustive or to limit the invention to the precise form disclosed. Rather, it is chosen and described to enable others skilled in the art to utilize the invention.

Figure 1:
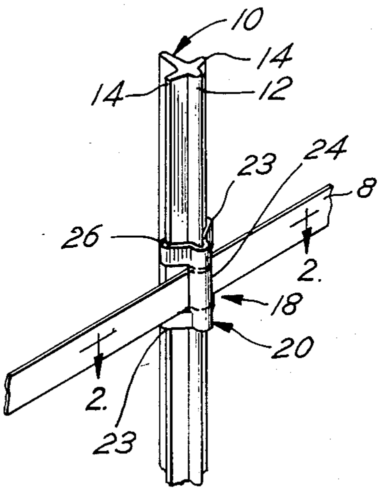
FIG. 1 is a fragmented perspective view of the insulator clip of this invention attached to a fiberglass fence post with the woven electric ribbon positioned therebetween.
Figure 3:
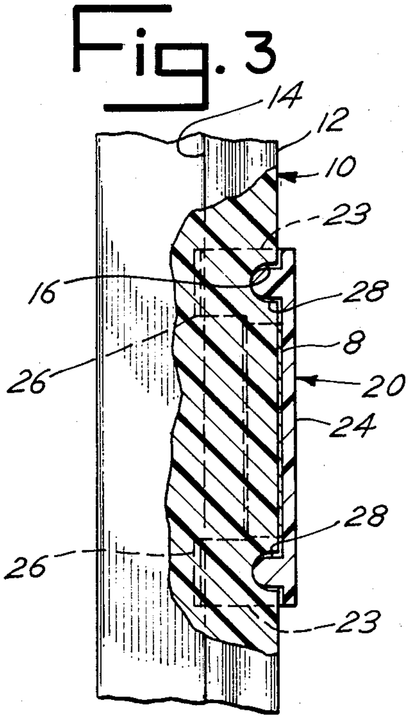
FIG. 3 is a fragmented longitudinal sectional view taken along line 3—3 of FIG. 2.
Figure 4:
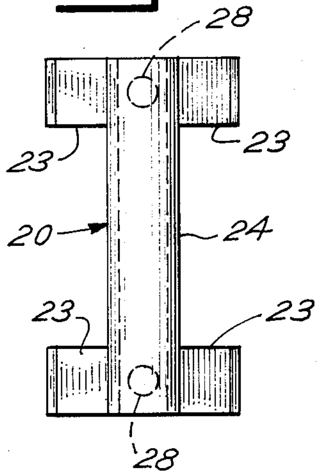
FIG. 4 is a front view of the clip part of this invention.

Referring now to the drawings, FIG. 1 illustrates a conventional fiberglass fence post 10 having a vertical rib 12 extending transversely between a pair of oppositely extending flanges 14. Rib 12 is interrupted by a series of longitudinally spaced indentations or notches 16 (see FIG. 3) transversely oriented with regard to rib 12. Notches 16 typically accommodate the horizontal strands of ordinary wire fencing material.

Figure 2:
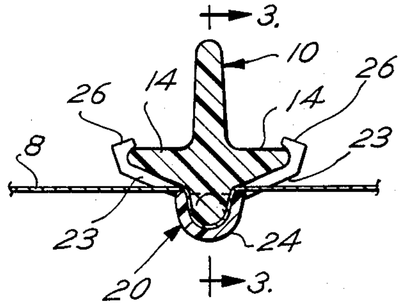
FIG. 2 is a cross sectional view taken along line 2—2 of FIG. 1.

The electric fence insulator 18 of this invention includes a clip 20 and may include a base 22 (see FIGS. 5–11). Clip 20, illustrated in FIGS. 1–4, formed of electrically insulative material such as non-conductive plastic, includes a longitudinal U-shaped body 24 and a pair of oppositely extending flanges 23 located at each end of the body. Body 24 is channel-shaped to accommodate rib 12 of post 10 with some clearance to also accommodate woven electric strip or ribbon material 8. Flanges 23 are configured to overlie post flanges 14 as shown in FIG. 2, and include inwardly extending opposed lips 26. Body 22 includes two spaced protrusions 28 which are located to fit within post notches 16.

In use, conductive wire or fence strip material 8 is positioned against post 10. Clip 20 is positioned adjacent to post 10 with strip material 8 located between the pair of flanges 23. Clip body 24 is aligned with post rib 12 and clip protrusions 28 are aligned with a pair of notches 16. Pressure is exerted against body 24 which urges flanges 23 outwardly until lips 26 are snap-fitted around post flanges 14. Protrusions 28 seat with notches 16 to prevent clip 20 from sliding downwardly along post 10.

To attach fence strip material 8 to a conventional metal post 30. A base 22 is combined with clip 20 and serves to insulate the fence strip material from the post (See FIGS. 5–7). Base 22 includes a generally rectangular body 32 which has a forwardly protruding rib 34 configured to accommodate the channel-shaped clip body 24. Rib 34 includes notches 36 positioned near each end of body 32 to receive clip protrusions 28. Oppositely tapered tabs 40 extend from each end of body 32.

Figure 5:
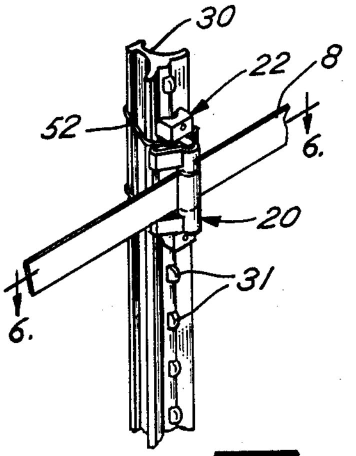
FIG. 5 is a fragmented perspective view of the clip and an associated base attached to a metal fence post with the woven ribbon supported between the base and clip.
Figure 6:
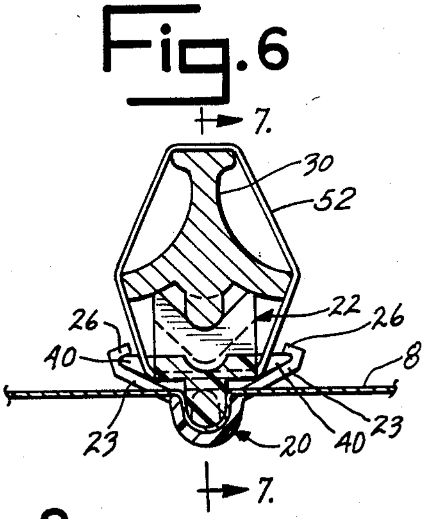
FIG. 6 is a cross sectional view taken along line 6—6 of FIG. 5.
Figure 8:
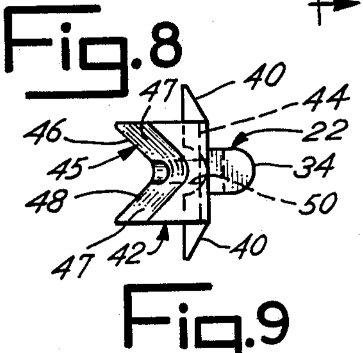
FIG. 8 is an end view of the base shown in FIG. 5.
Figure 7:
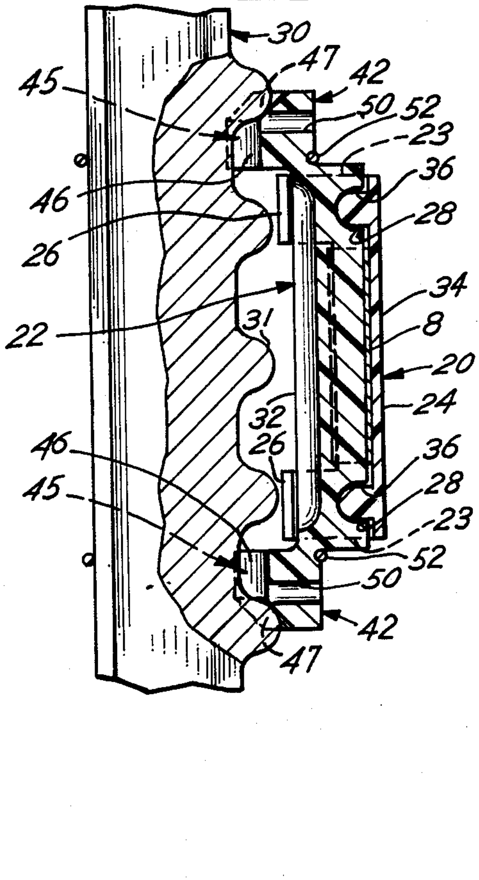
FIG. 7 is a fragmented longitudinal sectional view taken along line 7—7 of FIG. 6.
Figure 9:
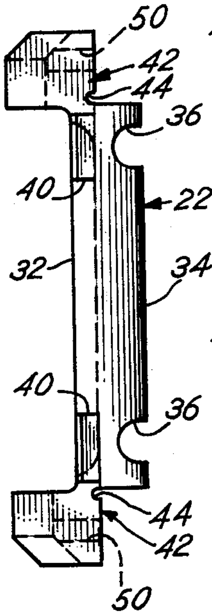
FIG. 9 is a side view of the base.
Figure 10:
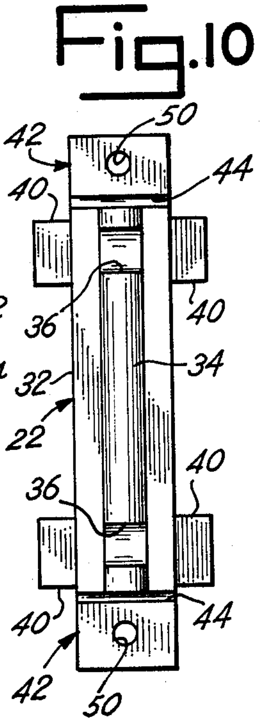
FIG. 10 is a front view of the base.

Base 22 further includes a saddle part 42 which extends longitudinally from each end of body 32. Each saddle part 42 has an inverted V-shaped longitudinal cavity 45 defined therein by angled walls 46, 48. Each saddle part cavity 45 includes a bevelled end portion 47 as shown in FIGS. 5 and 8. Base 22 has a groove 44 formed in each saddle part 42. A hole 50 is provided through each saddle part 42 as illustrated in the figures.

In use with a standard metal post 30, insulator 22 is located with the V-shaped cavities 45 of saddle parts 42 straddling metal post 30. Bevelled end portions 47 of saddle part cavities 45 are positioned so as to contact opposing parts of protrusions 31 of post 30 to prevent base 22 from sliding downwardly along the post. To hold base 22 tightly against post 30, a tie, such as an elastic ring 52, is fitted around post 30, seated within each base groove 44 and secured. Fence strip material 8 is positioned across base rib 34 and clip part 20 is snap fitted onto base 22 with lips 26 fitted about body tabs 40 to hold clip 20 tightly against base 22 with strip material 8 retained between rib 34 and clip body 24. Protrusions 28 of clip 20 are seated within notches 36 of base 22 to prevent longitudinal movement of clip 20 with respect to base 22.

Figure 11:
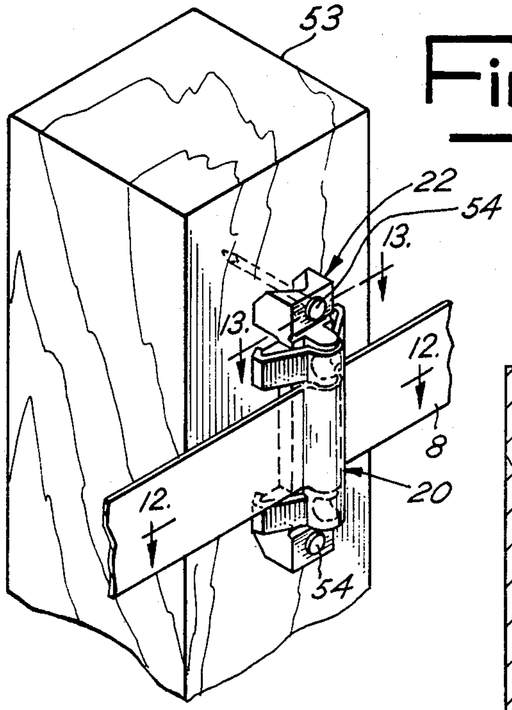
FIG. 11 is a fragmented perspective view of the clip and base of FIG. 5 shown attached to a wooden fence post with the woven electric ribbon retained between the base part and clip part.
Figure 12:
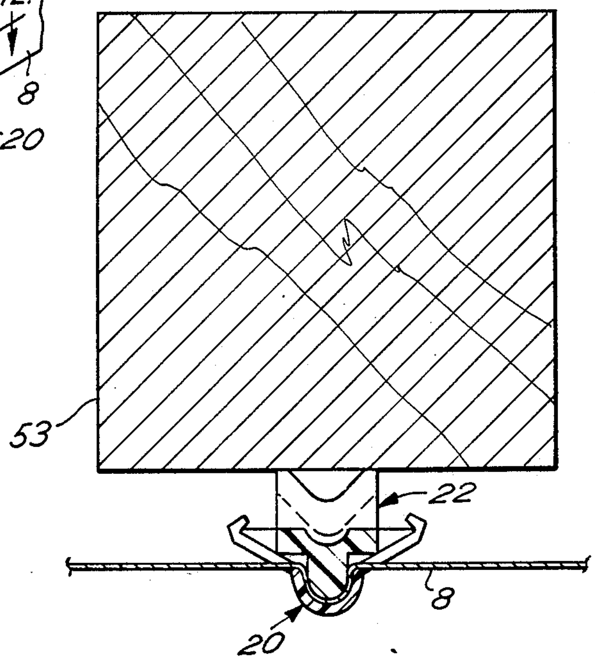
FIG. 12 is a cross sectional view taken from line 12—12 of FIG. 11.
Figure 13:
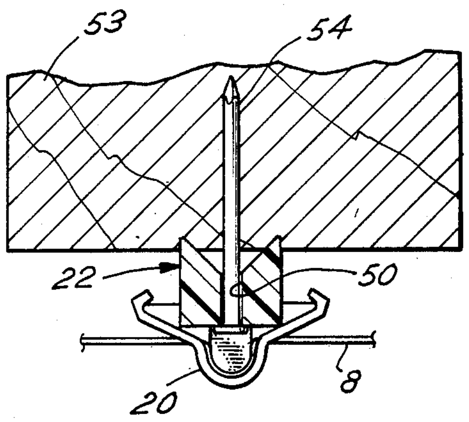
FIG. 13 is a fragmented cross sectional view taken from line 13—13 of FIG. 11.

FIGS. 11-13 illustrate the use of insulator 18 with a conventional wood fence post 53. To secure base 22 to wooden post 53, a nail 54 or other attachment device is inserted through each hole 50 in base saddle member 42 and driven into post 53 in a conventional manner. Such seating of saddle member 42 is illustrated in FIG. 13. After base 22 has been secured, fence strip material 8 and clip 20 are positioned and secured to the base in the fashion previously described with reference to metal fence post 30.

It should be understood that although the invention is illustrated as accommodating a strip type fence material, a common electric fence wire could be used in keeping with this invention.

It should be further understood that the invention is not to be limited to the precise form disclosed but may be modified within the scope of the appended claims.

We claim:

1. An electric fence insulator for connecting a conductive material to a support, said insulator including a clip member having securement means for snap connecting said clip member to said support with said conductive material retained between the clip member and support, said securement means including two pairs of opposed lip members extending from said clip member for engaging said support, said clip member further including a body part between said pairs of lip members, said body part having a length to accommodate said conductive material between said pairs of lip members, protrusion means extending from said body part for accommodation by said support to prevent longitudinal movement of said clip member relative to said support.

2. An electric fence insulator in combination with a fence post and connecting a conductive material to said post, said insulator comprising a clip member and an underlying base member, said clip member including two pairs of opposed lip members and a body part extending between said pairs of lip members, said body part having a length to accommodate said conductive material between said pairs of lip members, said clip member including protrusion means accommodated within said base member for preventing longitudinal movement of the clip member relative to the base member, said base member including a pair of oppositely extending tabs at each end, wherein said clip member is snap-connected to said base member by said lip members engaging said base member tabs with said conductive material retained therebetween under said clip member body part, said insulator being secured to said fence post by attachment parts.

3. The combination of claim 2 wherein said base member has openings therein at opposite ends, said attachment parts being fasteners extending through said openings and into said post.

4. The combination of claim 2 wherein said post includes projections, said base member having bevelled end portions abutting said post projections to limit longitudinal movement of the base member relative to the post.

5. The combination of claim 4 wherein said attachment parts are ties extending about said base member and post.

* * * * *